(12) United States Patent
Karlen

(10) Patent No.: US 10,792,740 B2
(45) Date of Patent: Oct. 6, 2020

(54) TOOL

(71) Applicant: Robert Bosch GmbH, Stuttgart (DE)

(72) Inventor: Urs Karlen, Stalden (CH)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 15/885,698

(22) Filed: Jan. 31, 2018

(65) Prior Publication Data

US 2018/0154470 A1 Jun. 7, 2018

Related U.S. Application Data

(63) Continuation of application No. 14/130,371, filed as application No. PCT/EP2012/061647 on Jun. 19, 2012, now Pat. No. 10,427,229.

(30) Foreign Application Priority Data

Jul. 1, 2011 (DE) .......................... 10 2011 078 488

(51) Int. Cl.
*B23D 61/00* (2006.01)
*B23D 65/00* (2006.01)

(52) U.S. Cl.
CPC ........... *B23D 61/006* (2013.01); *B23D 65/00* (2013.01); *Y10T 83/9362* (2015.04)

(58) Field of Classification Search
CPC .... B23D 61/006; B23D 65/00; Y10T 83/9362
See application file for complete search history.

(56) References Cited

U.S. PATENT DOCUMENTS

| 4,513,742 A | 4/1985 | Arnegger |
| 4,617,930 A | 10/1986 | Saunders |
| 6,022,353 A | 2/2000 | Fletcher et al. |
| 7,712,222 B2 | 5/2010 | Korb et al. |
| 2002/0017166 A1 | 2/2002 | Honickl |
| 2004/0098000 A1 | 5/2004 | Kleinwaechter |
| 2005/0245935 A1 | 11/2005 | Casey et al. |
| 2006/0191396 A1 | 8/2006 | Dion et al. |
| 2009/0013540 A1* | 1/2009 | Bohne .................. B23D 61/006 30/388 |
| 2011/0219929 A1* | 9/2011 | Mann ................... B23D 61/006 83/607 |
| 2011/0256814 A1 | 10/2011 | Steiger et al. |

(Continued)

FOREIGN PATENT DOCUMENTS

| CN | 1846915 A | 10/2006 |
| CN | 2865962 Y | 2/2007 |

(Continued)

OTHER PUBLICATIONS

International Search Report corresponding to PCT Application No. PCT/EP2012/061647, dated Oct. 12, 2012 (German and English language document) (7 pages).

*Primary Examiner* — Stephen Choi
(74) *Attorney, Agent, or Firm* — Maginot, Moore & Beck LLP

(57) ABSTRACT

A tool, in particular a plunge-cut saw blade, includes a saw blade that has at least one main body and at least one working part. The working part has at least one working edge with saw teeth and is connected integrally to the main body along a straight connecting edge. The working edge includes a curved and/or polygon-like formation thereon.

20 Claims, 3 Drawing Sheets

(56) References Cited

U.S. PATENT DOCUMENTS

2011/0316241 A1    12/2011  Zhang et al.
2012/0169018 A1*  7/2012  Lu ............................ B25F 3/00
                                                                                           279/143

FOREIGN PATENT DOCUMENTS

| | | |
|---|---|---|
| CN | 101678484 A | 3/2010 |
| DE | 40 36 904 C1 | 5/1992 |
| DE | 198 04 762 A1 | 7/1999 |
| DE | 20 2004 007 929 U1 | 8/2004 |
| DE | 103 25 392 A1 | 12/2004 |
| DE | 10 2004 050 798 A1 | 4/2006 |
| DE | 10 2007 058 889 A1 | 12/2008 |
| DE | 10 2008 041 425 A1 | 2/2010 |
| DE | 20 2010 013 008 U1 | 3/2011 |
| EP | 0 881 023 A2 | 12/1998 |
| EP | 1 170 082 A1 | 1/2002 |
| EP | 1 190 800 A2 | 3/2002 |
| EP | 1 297 932 A1 | 4/2003 |
| EP | 1481750 A1 | 12/2004 |
| EP | 2 011 444 A2 | 1/2009 |
| WO | 2010020458 A1 | 2/2010 |

\* cited by examiner

TOOL

This application is a continuation of U.S. application Ser. No. 14/130,371, which in turn is a 35 U.S.C. § 371 National Stage Application of PCT/EP2012/061647, filed on Jun. 19, 2012, which in turn claims the benefit of priority to Serial No. DE 10/2011078488.8, filed on Jul. 1, 2011 in Germany, the disclosures of each of which are incorporated herein by reference in their entirety.

BACKGROUND

There are already known tools, in particular plunge-cut saw blades, that have a saw blade comprising at least one main body and at least one working part, which working part has at least one working edge having a set of saw teeth and is connected integrally to the main body along a straight connecting edge. In the case of these tools, the working edge having the set of saw teeth is straight.

SUMMARY

The disclosure is based on a tool, in particular a plunge-cut saw blade, that has a saw blade comprising at least one main body and at least one working part, which working part has at least one working edge having a set of saw teeth and is connected integrally to the main body along a straight connecting edge.

A curved and/or polygon-like form of the working edge is proposed. A "plunge-cut saw blade" in this context is to be understood to mean, in particular, a tool having a saw blade provided to be driven, preferably in an oscillatory manner about a rotation axis, by a hand-held power tool. The tool preferably comprises a fastening part by which it can be fastened to a hand-held power tool. The plunge-cut saw blade can be suitable, in particular, for producing a slot-type opening by plunge-cutting into a workpiece. A "saw blade" in this context is to be understood to mean, in particular, a thin plate that is provided with a set of saw teeth on at least one edge and that is provided for performing work on a workpiece, with removal of material, by means of the set of saw teeth. A "main body" of the saw blade in this context is to be understood to mean, in particular, a part of the saw blade that is preferably made of a tough, fracture-resistant material. Preferably, the main body is made of a steel. Preferably, the main body constitutes the largest part of the saw blade. A "working part" of the saw blade in this context is to be understood to mean, in particular, a part of the saw blade that comprises the working edge provided with the set of saw teeth. Preferably, the working part is made of a hard, wear-resistant material, particularly preferably a high-speed steel (HSS). Also conceivable, however, are other materials, commonly known to persons skilled in the art, that are suitable for the main body and/or the working part. In particular, the working part is made of a harder and/or more wear-resistant material than the main body. The material of the working part in this case can also include a hard metal, or be composed of a hard metal. The hard metal in this case preferably includes at least one carbide—e.g. tantalum carbide, titanium carbide and/or tungsten carbide—and/or a nitride—e.g. boron nitride and/or titanium nitride. A "working edge" in this context is to be understood to mean, in particular, a connecting line constituted by the tips of the set of saw teeth of the working part. A "connecting edge" in this context is to be understood to mean, in particular, an edge along which the main body is connected integrally, in particular in a materially bonded manner, to the working part. The working part can be connected to the main body along the connecting edge, in particular, by electron-beam or laser welding. Also conceivable, however, are other methods for materially bonded connection that are commonly known to persons skilled in the art. A "curved" working edge in this context is to be understood to mean, in particular, that the working edge constituted by the connecting line of the tooth tips has a curvature. Preferably, the curved working edge is constituted by the shortest, continuously curved connecting line between the tooth tips. The curvature can differ in degree along the working edge. For example, the connecting line can be at least parabola-like. Preferably, the working edge is symmetrical in form with respect to a mid-perpendicular of the working edge. Particularly preferably, the working edge constitutes a circle segment, at least substantially. "Substantially" in this context is to be understood to mean, in particular, that more than 50%, preferably more than 80% of the length of the working edge constitutes a circle segment. Particularly preferably, the center of the circle segment is located substantially on the rotation axis of an oscillating sawing motion, for which the saw blade is provided. "Substantially" in this context is to be understood to mean, in particular, that the position of the center of the circle segment and the position of the rotation axis deviate by less than 20%, preferably by less than 10%, and especially by less than 5% relative to the shortest distance of the rotation axis relative to the center of the working edge. A "polygon-like" form of the working edge in this context is to be understood to mean, in particular, that the working edge includes a plurality of segments whose connecting lines of the tooth tips form straight lines, at least substantially. Preferably, at least three tooth tips form a straight-line segment in each case. "Substantially" in this context is to be understood to mean, in particular, that the deviation from a straight line is less than 10%, preferably less than 5%, particularly preferably less than 1% of the length of the respective segment. Preferably, the tooth spacings of teeth of the set of saw teeth of adjacent segments correspond to the tooth spacings of the teeth within a segment of the set of saw teeth, such that there are no gaps between the segments. Particularly preferably, the connecting points of the segments are located on a circle segment, at least substantially. Particularly preferably, the center of the circle segment is located substantially on the rotation axis of the sawing motion for which the saw blade is provided. The curved and/or polygon-like working edge prevents the outer edges of the set of saw teeth from becoming caught during plunge-cutting into the workpiece. A particularly precise sawing result can be achieved. Vibration can be minimized. The saw blade can have a particularly long service life. Work can be performed on particularly hard workpieces such as, for example, metals.

Preferably, a bimetallic strip comprises the main body and the working part. A "bimetallic strip" in this context is to be understood to mean, in particular, a strip of material composed, at least, of two differing metals and/or metal alloys. In particular, the strip of material can be composed of a tough basic material and, at least partially, of a harder, wear-resistant material particularly suited to constituting a set of saw teeth. The tough part of the bimetallic strip can constitute the main body, and the wear-resistant, harder part can constitute the working part of the saw blade. The basic material can preferably be constituted by a steel, while the harder part can preferably be constituted by a high-speed steel. The material of the harder part in this case can also include a hard metal or be composed of a hard metal. The hard metal in this case preferably includes at least one carbide—e.g. tantalum carbide, titanium carbide and/or tungsten carbide—and/or a nitride—e.g. boron nitride and/or titanium nitride. The two parts are preferably connected in a materially bonded manner, in particular by electron-beam or laser welding, along a straight connecting edge. An efficient saw blade having a particularly long service life can be achieved.

It is proposed that the saw blade be made of a bimetallic strip having two edges that are at least substantially parallel. Preferably, the saw blade is made of a bimetallic strip that is at least substantially rectangular. Particularly preferably, the connecting edge of the two metals and/or metal alloys of the bimetallic strip is parallel to at least two parallel edges of the bimetallic strip. In particular, the saw blade can be made of a bimetallic strip that is produced by parting-off from a bimetallic band. Preferably, the connecting edge and the two parallel edges are located in the longitudinal direction of the bimetallic band. "Substantially parallel" in this context is to be understood to mean, in particular, that a deviation from a parallelism of the two edges is less than 10°, preferably less than 5°, particularly preferably less than 1°. "Substantially rectangular" in this context is to be understood to mean, in particular, that the edges of the material strip enclose between them angles of between 85° and 95°, preferably between 88° and 92°, particularly preferably between 89° and 91°. The saw blade can be produced particularly inexpensively from a bimetallic strip.

The working edge having the set of saw teeth can be produced by a stamping method, a laser cutting method or other method known to persons skilled in the art. Advantageously, the working edge and/or the set of saw teeth is/are produced by a milling process. Particularly advantageously, the working edge and/or the set of saw teeth is/are produced by a grinding process. A working edge and/or a set of saw teeth of particularly high quality can be produced in a grinding process. Also possible are combinations of differing production methods considered appropriate by persons skilled in the art.

It is furthermore proposed that a height of the working part be greater than a height of the set of saw teeth. A "height of the working part" in this context is to be understood to mean, in particular, the measure, perpendicular to the connecting edge, from the center of the working edge as far as the start of the main body. A "height of the set of saw teeth" in this context is to be understood to mean, in particular, a height, measured perpendicularly to the connecting edge, between the tooth tip at the greatest distance from the connecting edge and the tooth tip at the least distance from the connecting edge. Advantageously, this enables at least all tooth tips to be made of a hard and/or wear-resistant material. Particularly advantageously, a "height of the set of saw teeth" in this context is to be understood to mean the maximum extent of the set of saw teeth from the tooth base to the tooth tips of all teeth in the saw blade, measured perpendicularly to the connecting edge. Advantageously, this enables the set of saw teeth to be made entirely of a hard and/or wear-resistant material. The wear resistance of the saw blade can be improved.

It is furthermore proposed that the saw blade be connected to the fastening part in an overlapping manner. A particularly stable connection can be achieved between the working part and the saw blade. Differing connection methods, commonly known to persons skilled in the art, are conceivable. The saw blade can be adhesive-bonded or riveted to the fastening part. Preferably, the saw blade is fastened to the fastening part by means of a spot-welded connection. A particularly robust, inexpensive connection can be achieved. It is possible to dispense with further means for connection, such as rivets and/or welding materials and adhesives.

Also proposed is a method for producing a tool. It is proposed that, in a first production step, a bimetallic strip be parted off from a bimetallic band. Preferably, the bimetallic strip is parted off, at least substantially, transversely in relation to the connecting edge of the two metals and/or metal alloys of the bimetallic strip. The bimetallic strip preferably comprises at least one part made of a tough metal, and at least one part made of a harder, more wear-resistant metal, which parts are connected in a materially bonded manner via a connecting edge. The tough part preferably constitutes the main body of the saw blade, and the harder, wear-resistant part constitutes the working part of the saw blade. In a further production step, the curved and/or polygon-like working edge and the set of saw teeth is/are formed on a straight edge of the working part that is preferably aligned parallel to the connecting edge. The working edge having the set of saw teeth can be formed by a milling method, preferably by means of a grinding method. Stamping methods and other methods commonly known to persons skilled in the art are also conceivable. Preferably, the working edge and the set of saw teeth are produced in one working step. In a further working step, the saw blade having a straight edge is connected to the fastening part in an overlapping manner, in particular by a spot-welded connection. The saw blade can be produced in a particularly inexpensive and precise manner. In particular, distortion of the saw blade can be prevented, and the saw blade can be made to lie flatly on the fastening part in a particularly precise manner.

BRIEF DESCRIPTION OF THE DRAWINGS

Further advantages are given by the following description of the drawings. The drawings show exemplary embodiments of the disclosure. The drawings, the description and the claims contain numerous features in combination. Persons skilled in the art will also expediently consider the features individually and combine them to create appropriate further combinations.

In the drawings.

DETAILED DESCRIPTION

Figure 1:
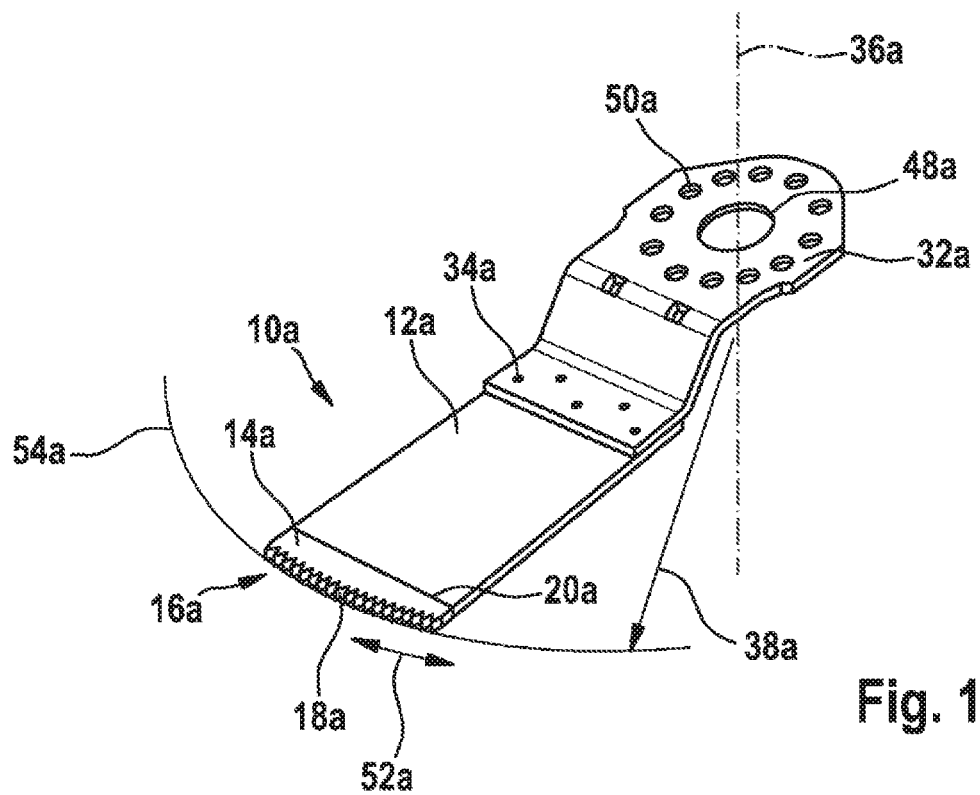
FIG. 1 shows a schematic representation of a tool according to the disclosure, having a saw blade.
Figure 2:
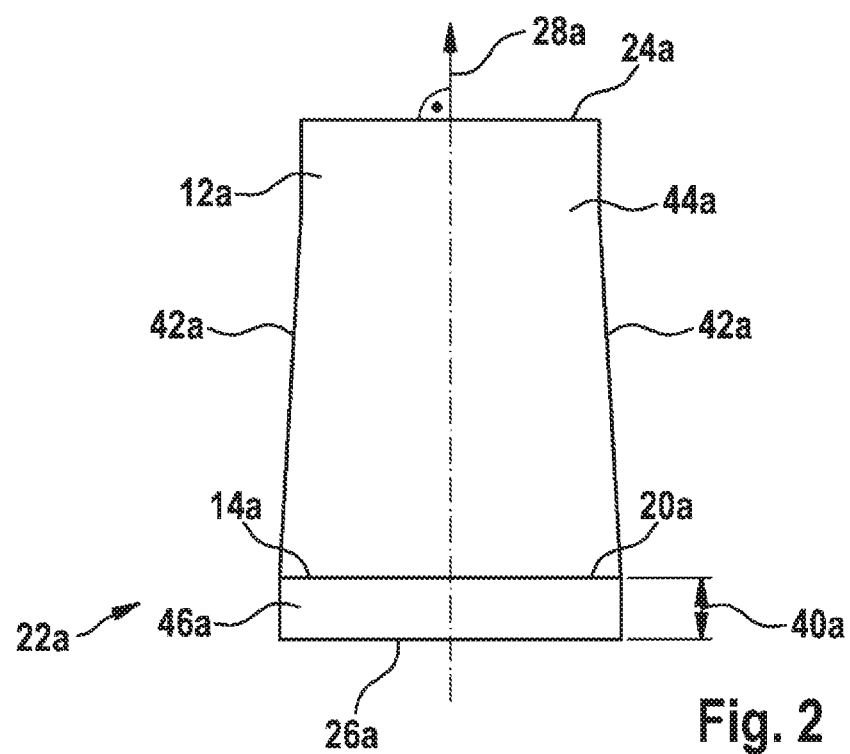
FIG. 2 shows a schematic representation of a bimetallic strip for producing a saw blade.
Figure 3:
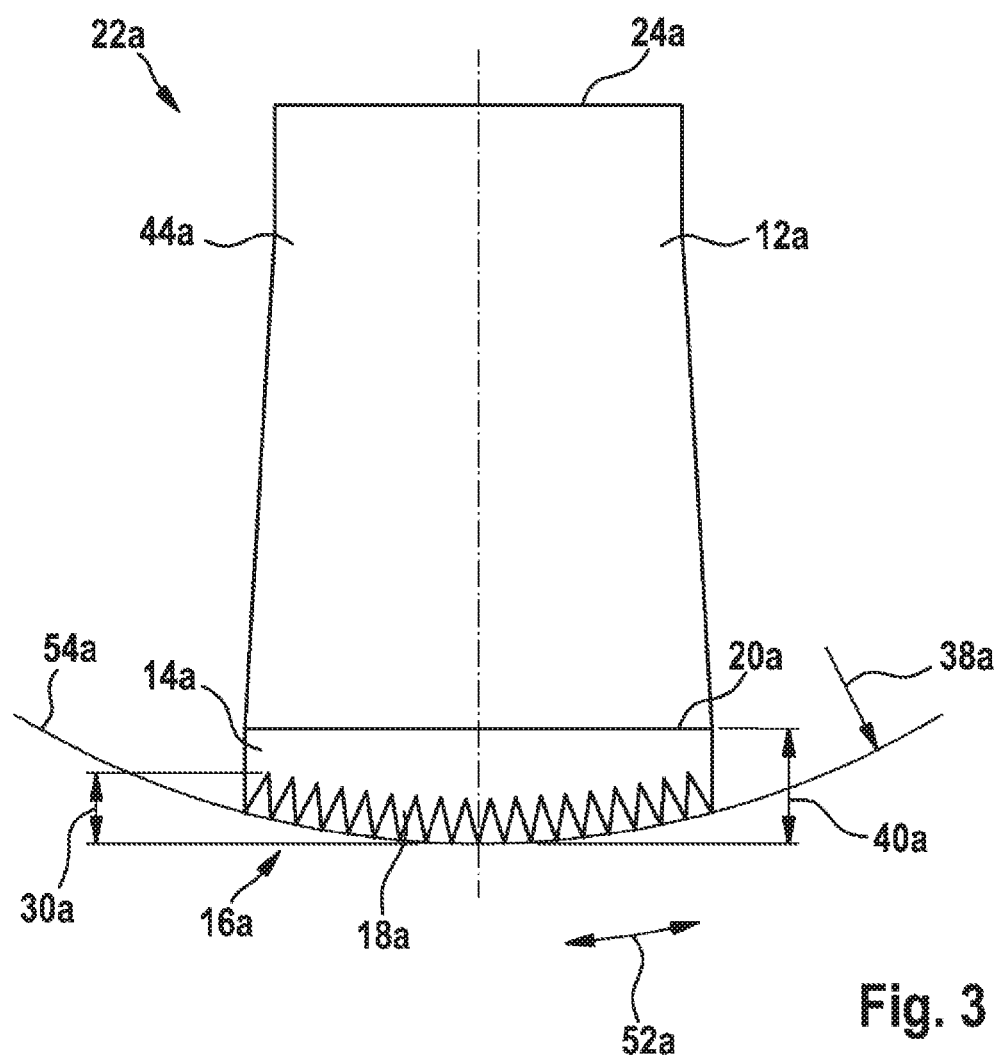
FIG. 3 shows a schematic representation of the saw blade following the attachment of the working edge according to the disclosure, having a set of saw teeth.

FIG. 1 shows a tool, realized as a plunge-cut saw blade, that has a saw blade 10*a* comprising a main body 12*a* and a working part 14*a*, which working part has a working edge 16*a* having a set of saw teeth 18*a* and is connected integrally to the main body 12*a* along a straight connecting edge 20*a*. The working edge 16*a*, constituted by a continuously curved line along tooth tips of the set of saw teeth 18*a*, has a curved form. The saw blade 10*a* is composed of a bimetallic strip 22*a*, which comprises the main body 12*a* and the working part 14*a* (FIG. 2). The bimetallic strip 22*a* has a wider steel strip 44*a* and a narrower high-speed steel strip 46*a*. Alternatively or additionally, the narrower high-speed steel strip 46*a* can also be made of a material that includes at least one hard metal or that is composed of at least one hard metal. The hard metal in this case preferably includes, as a reinforcement phase, at least one carbide—e.g. tantalum carbide, titanium carbide and/or tungsten carbide—and/or a nitride—e.g. boron nitride and/or titanium nitride. In particular, a strip composed of a broader steel strip 44*a* and a narrower strip 46*a* that includes a hard metal is also to be understood to be a bimetallic strip 22*a* within the meaning of the disclosure. The two strips 44*a*, 46*a* are connected along the connecting edge 20*a*, via a welded connection, for example a laser-welded connection or electron-beam welded connection. The bimetallic strip 22*a* has two parallel edges 24*a*, 26*a*. The connecting edge 20*a* is likewise parallel to the edges 24*a*, 26*a*. The working edge 16*a* and the set of saw teeth 18*a* (FIG. 3) are applied to the bimetallic strip 22*a* in a grinding process. A height 40*a* of the working part 14*a*, measured perpendicularly to the center of the working edge, or connecting edge 20*a*, is greater than a height 30*a* of the set of saw teeth 18*a*. The height 30*a* of the set of saw teeth 18*a* extends over the maximum extent of all saw teeth. It is also possible for the height 40*a* of the working part 14*a* to be selected such that at least all tooth tips of the set of saw teeth 18*a* are located in the working part 14*a*.

A fastening part 32*a*, to which the main body 12*a* of the saw blade 10*a* is connected in an overlapping manner by means of a spot-welded connection 34*a*, serves to fasten the tool to a hand-held power tool, not represented in greater detail. The tool is provided to be driven in an oscillatory manner about a rotation axis 36*a* by the hand-held power tool. A centering means 48*a*, which is realized as an opening in the fastening part 32*a*, serves to center the tool on a drive axis of the hand-held power tool. Form closure means 50*a* serve to transmit torque from the hand-held power tool and to define a rotary position. The curvature of the working edge 16*a* corresponds to a circle segment having a radius 38*a* about the rotation axis 36*a*. The edge 24*a* of the main body 12*a* faces toward the rotation axis 36*a*. When a slot is sawed into the workpiece by plunging the saw into the workpiece, the working edge 16*a* provided with the set of saw teeth 18*a* does not become caught. The set of saw teeth 18*a* moves with a sawing motion 52*a* along a circular path 54*a* having the radius 38*a* about the rotation axis 36*a*. The curved working edge 16*a* provided with the set of saw teeth 18*a* executes a uniform cut.

For the purpose of producing the tool, the working edge 16*a* and the set of saw teeth 18*a* are produced in one working step. The bimetallic strip 22*a* is then parted off from a bimetallic band, not represented, by means of a parting tool, and the side edges 42*a* are produced at the parting edges of the bimetallic strip 22*a*. The side edges 42*a* are inclined in the direction of the rotation axis 36*a*, such that the saw blade 10*a* tapers in the direction of the rotation axis 36*a*. The bimetallic strip 22*a* includes a broader steel strip 44*a* and a narrower high-speed steel strip 46*a*, which are connected in a materially bonded manner along the connecting edge 20*a*. An outer edge of the steel strip 44*a* constitutes the edge 24*a* of the main body 12*a* of the saw blade 10*a*, and an outer edge of the high-speed steel strip 46*a* constitutes the edge 26*a* of the working part 14*a* of the saw blade 10*a*. The curved working edge 16*a* provided with the set of saw teeth 18*a* is produced, in a grinding process, at the edge 26*a* of the working part 14*a*. The main body 12*a* is connected to the fastening part 32*a* in an overlapping manner by means of a spot-welding operation. A center normal 28*a* of the edge 24*a* is aligned in the direction of the rotation axis 36*a* of the fastening part 32*a*.

The following description and the drawing of a further exemplary embodiment are limited substantially to the differences between the exemplary embodiments and, in principle, reference may be made to the drawing and the description of the other exemplary embodiment in respect of components having the same designation, in particular in respect of components having the same reference numerals. In order to differentiate the exemplary embodiments, instead of the letter a of the first exemplary embodiment, the letter b has been appended to the reference numerals of the further exemplary embodiment.

Figure 4:
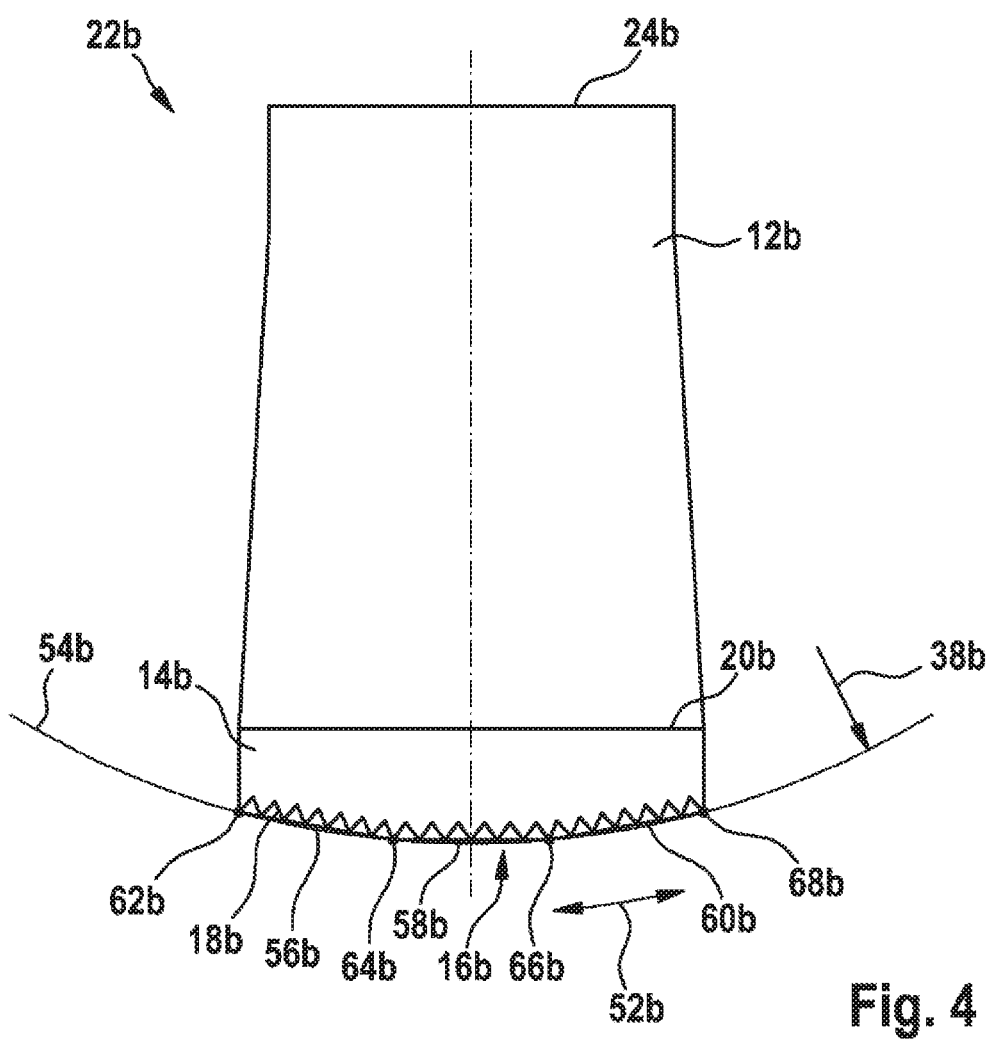
FIG. 4 shows a schematic representation of a saw blade following the attachment of the working edge according to the disclosure, having a set of saw teeth, in a second embodiment.

FIG. 4 shows a saw blade 10*b* in a further exemplary embodiment. A working edge 16*b* of the saw blade 10*b* has a polygon-like form. The working edge 16*b* has three straight polygon segments 56*b*, 58*b*, 60*b*. The central polygon segment 58*b* is aligned parallel to a connecting edge 20*b*. The polygon segments 56*b* and 60*b* are inclined, relative to the polygon segment 58*b*, in the direction of a rotation axis 36*b*. End points 62*b*, 64*b*, 66*b*, 68*b* of the polygon segments 56*b*, 58*b*, 60*b* are located on a circular path 54*b* having a radius 38*b* about the rotation axis 36*b*. Also conceivable are realizations having a greater number of polygon segments.

What is claimed is:

1. A tool, comprising:
    a saw blade composed of a bimetallic strip, the saw blade including:
        at least one main body, and
        at least one working part connected integrally to the main body along a straight connecting edge, the working part having at least one working edge having a set of saw teeth; and
    a fastening part configured to center the tool for oscillation about a rotation axis, the main body fastened to the fastening part in an overlapping manner,
    wherein the working edge is defined by a shortest, continuously-curved connecting line touching each tooth tip of the set of saw teeth, the connecting line having a curvature that differs in degree along a length of the working edge, and
    wherein the bimetallic strip defines a first straight edge of the main body, the first straight edge oriented at least substantially parallel to the straight connecting edge and facing toward the rotation axis.

2. The tool as claimed in claim 1, wherein a first portion of the bimetallic strip defines the main body and a second portion of the bimetallic strip defines the working part.

3. The tool as claimed in claim 2, wherein the bimetallic strip is configured to have an intermediate processing state in which the bimetallic strip defines a second straight edge of the working part that is at least substantially parallel to the straight connecting edge, the first and second straight edges each spaced apart from the straight connecting edge.

4. The tool as claimed in claim 1, wherein a height of the at least one working part is greater than a height of the set of saw teeth.

5. The tool as claimed in claim 1, wherein the main body is fastened to the fastening part by a spot-welded connection.

6. The tool as claimed in claim 1, wherein the fastening part defines a centering opening and a form closure mechanism that is spaced from and encircles the centering opening, wherein the centering opening is configured to center the tool about the rotation axis but not to transfer torque from the tool, and wherein the form closure mechanism is configured to transmit torque from the tool and to define a rotary position of the saw blade relative to the tool.

7. The tool as claimed in claim 1, wherein the bimetallic strip includes two different metal or metal alloy materials that are materially bonded together along the straight connecting edge.

8. The tool as claimed in claim 1, wherein the working edge is symmetrical in form with respect to a mid-perpendicular of the working edge.

9. The tool as claimed in claim 1, wherein the connecting line has a shape that approximates a parabola.

10. The tool as claimed in claim 1, wherein a portion of the length of the working edge substantially defines a circle segment the center of which is located substantially on a rotation axis of an oscillating sawing motion.

11. A method for producing a tool, comprising:
parting off a bimetallic strip from a bimetallic band to form a saw blade of the tool, the bimetallic band having a first portion and a second portion connected integrally to the first portion along a straight connecting edge such that, when the bimetallic strip is parted off, the first portion defines at least one main body of the saw blade and the second portion defines at least one working part of the saw blade; and
forming a set of saw teeth in at least one working edge of the working part, the working edge defined by a shortest, continuously-curved connecting line touching each tooth tip of the set of saw teeth, the connecting line having a curvature that differs in degree along a length of the working edge.

12. The method as claimed in claim 11, wherein the at least one working edge is produced when the set of saw teeth is produced.

13. The method as claimed in claim 11, wherein the working edge is symmetrical in form with respect to a mid-perpendicular of the working edge.

14. The method as claimed in claim 11, wherein the length of the working edge defines a circle segment the center of which is located substantially on a rotation axis of an oscillating sawing motion.

15. The method as claimed in claim 11, the method further comprising fastening the main body to a fastening part of the tool in an overlapping manner.

16. The method as claimed in claim 15, wherein the first portion of the bimetallic strip defines a second straight edge of the main body, the second straight edge oriented substantially parallel to the straight connecting edge and spaced apart from the straight connecting edge.

17. The method as claimed in claim 16, wherein the fastening part is configured to center the tool for oscillation about a rotation axis, and wherein the second straight edge faces toward the rotation axis after the main body is fastened to the fastening part.

18. The method as claimed claim 16, wherein the straight connecting edge and the second straight edge extend in a direction corresponding to a longitudinal direction of the bimetallic band prior to the parting off of the bimetallic strip.

19. The method as claimed in claim 11, wherein the bimetallic strip is parted off substantially transversely in relation to the straight connecting edge.

20. The method as claimed in claim 11, wherein the second portion of the bimetallic strip defines the working edge, and wherein, prior to forming the set of saw teeth, the working edge is a first straight edge that is oriented substantially parallel to the straight connecting edge and spaced apart from the straight connecting edge.

* * * * *